Sept. 4, 1956     F. G. DENNISON     2,761,736
FUEL NOZZLE
Filed June 21, 1954
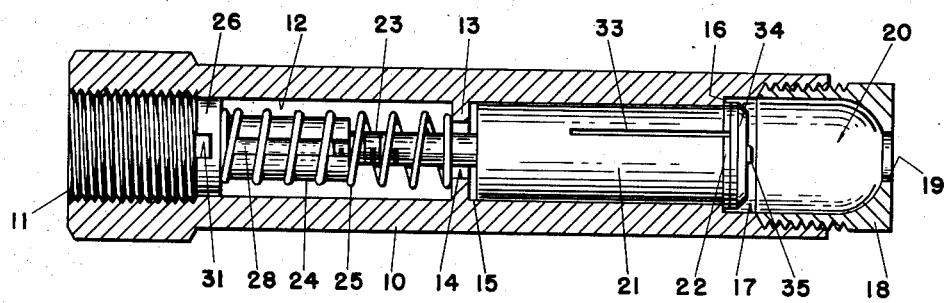
FIG. I
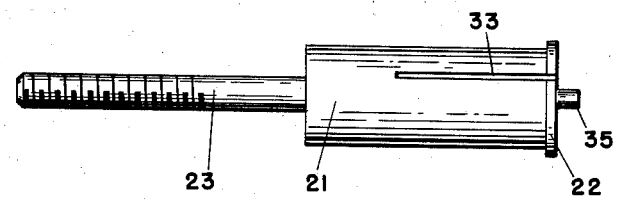
FIG. 2
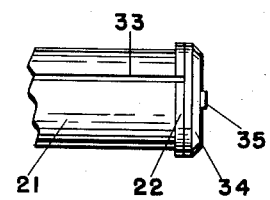
FIG. 5
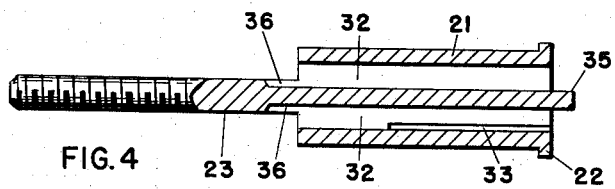
FIG. 4
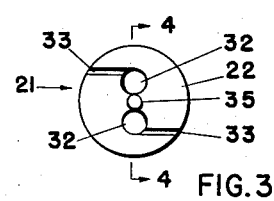
FIG. 3
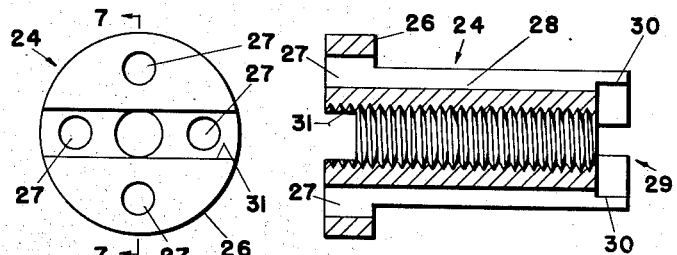
FIG. 6     FIG. 7
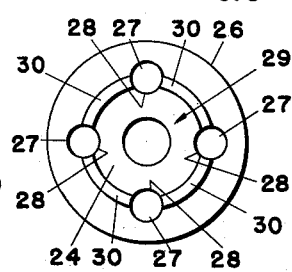
FIG. 8
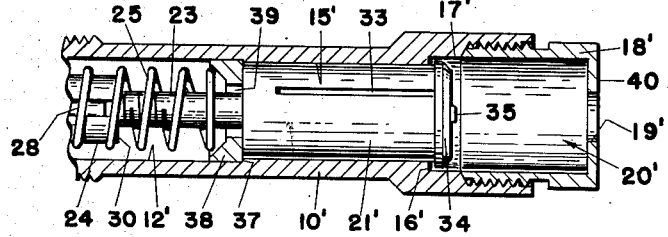
FIG. 9
INVENTOR
FRANK G. DENNISON
BY Robert P. Outerbridge
HIS ATTORNEY › # United States Patent Office 2,761,736
Patented Sept. 4, 1956

2,761,736
FUEL NOZZLE

Frank G. Dennison, Harvard, Mass., assignor to Spray Engineering Company, Somerville, Mass., a corporation of Massachusetts Application June 21, 1954, Serial No. 438,268

11 Claims. (Cl. 299—118)

The present invention relates to fuel injection nozzles and more particularly to such nozzles characterized by a whirl chamber having a liquid fuel inlet of variable area or size and a discharge orifice of fixed or constant size from which the fuel emits in a hollow cone atomized spray.

One important field of use of such nozzles is in the burners of jet engines used in aircraft and another important field is in the engines of guided missiles. In both cases it is important that there be proper atomization of the fuel supplied throughout the entire range of engine performance, and it is equally important that there be a proper increase in the amount of atomized fuel discharged as operating conditions call for increased fuel consumption. In numerous fields other than the two just stated it is often entirely practicable to employ nozzles the inlets of which are of fixed size and to rely upon variations in liquid pressure alone to effect variations in volumetric delivery. But the size of apparatus necessary to produce the pressure necessary for a wide range of volumetric delivery with such nozzles makes their use entirely out of the question in aircraft and guided missiles, and resort is therefore had to variable area inlet nozzles since their purpose is to get a wide range of volumetric capacity through a small range of pressure in the fuel sprayed. As an indication of the contrast between the pressures required for the two types of nozzles, a change in capacity from one G. P. M. to ten G. P. M. with a nozzle having an inlet of fixed size might require a change in pressure from 10 p. s. i. to 1000 p. s. i. Stating this differently, a change in capacity in the ratio of 1 to 10 might require a change in pressure in the ratio of 1 to 100. In marked contrast, with a comparable nozzle having a variable area inlet a change in capacity from one G. P. M. to ten G. P. M. might require a change in pressure from 10 p. s. i. to only 50 p. s. i., that is, a change in capacity in the ratio of 1 to 10 might require a change in pressure in the ratio of only 1 to 5.

It is therefore the principal object of the present invention to provide a liquid fuel atomizing injection nozzle such that as the pressure on the fuel is increased beyond a given amount the area or size of the fuel inlet to the whirl chamber is itself automatically increased in a manner commensurate with the pressure.

In the operation of such nozzles in jet engines and guided missiles, for example, it is also very important that there be no interruption in combustion such as would result if the inlet to the whirl chamber became closed under low fuel pressure or at least became too small to provide sufficient fuel delivery. To prevent such a result it is a further object of the present invention to provide a fuel injection nozzle as above referred to characterized by the fact that while the size or area of the fuel inlet to the whirl chamber is automatically varied under the influence of changes in the fuel pressure, there is a minimum area or size below which the inlet can not be reduced regardless of low fuel pressure conditions.

To the accomplishment of these objects and of such others as will appear hereinafter, the various features of the present invention reside in certain constructions, combinations, and arrangements of parts which are all fully described hereafter in this specification and are then set forth in the appended claims the subject matters of which possess advantages which will be readily apparent to those skilled in the art.

The various features of the present invention will be readily understood from reading this specification in connection with the accompanying drawing which illustrates the best physical embodiments of the invention at present known to the inventor and in which Fig. 1 is a longitudinal sectional view of an embodiment of the present invention suitable for use in jet engines and guided missiles;

Fig. 2 is a view in elevation of the reciprocable member or plunger shown in Fig. 1;

Fig. 3 is a view in elevation of the forward end of the reciprocable member;

Fig. 4 is a view in sectional elevation taken along the line 4—4 of Fig. 3;

Fig. 5 is a detail view in elevation showing the structure of the forward end of the reciprocable member;

Fig. 6 is an enlarged view in rear end elevation of the spring seat shown in Fig. 1;

Fig. 7 is a view in sectional elevation taken along the line 7—7 of Fig. 6;

Fig. 8 is an enlarged view in front end elevation of the spring seat shown in Fig. 1; and Fig. 9 is a detail view in longitudinal section corresponding to Fig. 1 and illustrating modifications of the nozzle structure shown in Figs. 1–8.

Referring to the drawings, there is shown in Fig. 1 a nozzle body portion 10 which is generally tubular in shape and which is provided with an interiorly threaded inlet 11 at its rear end for attachment to a source of liquid fuel supply (not shown). Exteriorly the body 10 may be of hex contour in the vicinity of the inlet 11 to facilitate such attachment, and is so shown. Leading from the inlet 11 the body 10 is provided with a cylindrical chamber 12 terminating forwardly at an integral annular partition 13 having an axial opening 14, and forwardly of the partition 13 and opening 14 the body 10 is provided with an axial cylindrical bore 15 which terminates at its forward end at an annular shoulder 16 of greater diameter than the bore 15 and located at the base of a cylindrical passage 17 which is coaxial with the bore 15. Forwardly of the passage 17 the body 10 is internally threaded to receive a tip or cap 18 which has a discharge orifice 19 of fixed or constant size and which is coaxial with the passage 17 and bore 15. The cap 18 is domed interiorly in the vicinity of the orifice 19 and therebehind is cylindrical with a diameter the same as that of the passage 17 in the illustrated embodiment. As will be more fully explained hereinafter, the cylindrical passage 17 in the nozzle body 10 and the interior of the cap 18 together form a whirl chamber 20, and it will be seen from Fig. 1 that the inlet 11, chamber 12, partition opening 14, and bore 15 together form a through passage to this whirl chamber 20 from the source of liquid fuel supply.

Mounted for reciprocation in the bore 15 with a sliding fit is a cylindrical member or plunger 21 (Figs. 1–5), and movement of the plunger 21 in a direction away from the discharge orifice 19 is limited by an integral flange 22 formed on the forward end of the plunger 21 and located in the cylindrical passage 17 in the Fig. 1 showing so as to be abuttable with the annular shoulder 16. For a reason explained below the diameter of the flange 22 is less than that of the cylindrical surface 17 so as to provide an annular space between the surface 17 and the flange, and this space is exaggerated in Fig. 1 merely to indicate it clearly. From the rear of the plunger 21 an axial stem 23 extends through the partition opening 14 into the chamber 12 where it threadedly receives a spring seat 24 (Figs. 1 and 6–8) which has a diameter at its forward end greater than that of the partition opening 14. A spring 25 coiled about the seat 24 and stem 23 has one end abutting the partition 13 and the other end abutting a flange 26 formed on the rear end of the seat 24, and with this construction it will be seen that the spring 25 functions to maintain the plunger 21 normally in a retracted position with respect to the whirl chamber 20 and away from the discharge orifice 19, with the plunger flange 22 engaged with the shoulder 16 as a stop, as shown in Fig. 1, but spaced from the surface 17.

Since the spring seat 24 as a whole occupies a considerable portion of the chamber 12, it is desirable that passages be formed in the seat 24 to permit the maximum flow of fuel through the chamber 12. To this end the seat 24 is made from stock which is initially provided with four cylindrical and parallel passages 27, indicated in Fig. 6, after which the stock is turned down to produce the flange 26, an operation which causes portions of the initially formed passages 27 to become grooves 28 located ahead of the flange 26, as best shown in Figs. 7–8. For a purpose which will be described, the forward end of the seat 24 is cupped as indicated at 29, and as shown in Fig. 8 the walls of the cup are interrupted by the grooves 28 to form four spaced cup wall portions 30. To facilitate mounting the spring seat 24 on the threaded stem 23, the seat is provided with a slot 31 (Figs. 1 and 6–7) at its rear end to receive a turning tool.

To provide for the admission of fuel into the whirl chamber 20, the plunger 21 is formed internally with two longitudinal through passages 32 (Figs. 3–4) which terminate forwardly at the front face of the flange 22, and extending tangentially from each passage 32 is a passage in the form of a slot 33 (Figs. 1–5) which terminates laterally at the surface of the plunger 21. Rearwardly each slot 33 terminates short of the rear of the plunger 21, as indicated in Figs. 1–2 and 4, but each slot 33 extends through the flange 22 as well as through the plunger 21 and with this construction it will be seen that with the parts in the positions shown in Fig. 1, i. e., even with the flange 22 abutting the shoulder 16 as a stop, the portion of each slot 33 formed in the flange 22 is always exposed in the whirl chamber 20 since there is a small space between the periphery of the flange 22 and the cylindrical surface 17.

The forward end of the plunger structure is completed by a disc 34 (Figs. 1 and 5) having preferably a beveled front portion and a central opening which receives a projection 35 (Figs. 1–5) extending forwardly from the center of the flange 22 and which is peened over to hold the disc 34 in abutment with the front face of the flange. The disc 34 has the same diameter as the flange 22, and since the passages 32 extend through the flange it will be seen that the disc 34 functions as a closure for the front end of the plunger structure so that liquid fuel in the passages 32 must flow into the whirl chamber 20 by way of the tangential slots 33 and not in a direction parallel with the axis of the whirl chamber.

The structure of the embodiment illustrated in Figs. 1–8 as a group is completed by grooves 36 (Fig. 4) which are formed in the stem 23 at the rear of the plunger 21 and which function as rearward extensions or continuations of the passages 32 for a purpose which is described below.

In operation, liquid fuel admitted under pressure at the body inlet 11 flows through the spring seat passages 27, the chamber 12, the partition opening 14, and the plunger passages 32 to the tangential slots 33. Initially the plunger 21 remains stationary and the inlet for liquid into the whirl chamber 20 consists of only the portions of the slots 33 which are located in the flange 22, the reason for this being that the compression value of the spring 25 is not initially exceeded, so that the spring performs its function of normally maintaining the flange 22 in abutment with the shoulder 16, i. e., in a retracted position with respect to the whirl chamber 20 and the orifice 19. This location for the flange 22 provides a minimum area of the slots 33 exposed in the whirl chamber 20 and this minimum can not be reduced regardless of low fuel pressure conditions. Until the pressure on the liquid increases to a point where it is greater than the compression value at which the spring 25 is initially set as determined by the location of the spring seat 24 on the stem 23, the inlet to the whirl chamber 20 will continue to be of minimum size or area, i. e., only the portions of the slots 33 located in the flange 22, and any increase in volume of liquid admitted to the whirl chamber and discharged from the orifice 19 will be the result of liquid pressure increase only.

When, however, the pressure on the liquid becomes greater than the compression value at which the spring 25 is initially set, the liquid presses on the rear end of the plunger 21 and pushes it forwardly in the bore 15 and whirl chamber 20, i. e., toward the discharge orifice 19 in an extended position into the whirl chamber, with the result that the slots 33 become exposed in the whirl chamber to an increasing extent as the plunger 21 moves forward into the whirl chamber, thereby causing the inlet to the whirl chamber, i. e., the exposed portions of the slots 33, to increase in area because there is increase in exposure. Stating this last differently, while the discharge orifice 19 remains fixed or constant in size, the increase in the area of exposure of the slots 33 in the whirl chamber 20 provides for increased volume of delivery of liquid into the whirl chamber and hence increased volume of discharge from the orifice 19. Since the liquid is discharged into the whirl chamber 20 tangentially by the slots 33, the liquid undergoes a whirling motion in the chamber and hence emits from the discharge orifice 19 in a hollow cone atomized spray, as is well understood. The discharge orifice 19 is shown in the drawings as being relatively large so that the slots 33 are the controlling factor in the delivery capacity of the nozzle structure.

With further reference to Fig. 1, it will be appreciated that the spring 25 normally maintains the flange 22 in abutment with the shoulder 16 because the rear end of the spring presses rearwardly on the spring seat flange 26 and thus yieldingly urges the flange 26, seat 24, stem 23, and the plunger 21 rearwardly. From this it follows that if there is a great enough pressure exerted on the liquid the initial compression value of the spring 25 may be overcome to such an extent that the plunger 21 will extend into the whirl chamber 20 and toward the orifice 19 sufficiently far as to result in contact of the plunger disc 34 with the domed interior portion of the cap 18. To prevent this result, the spring seat 24 is located on the stem 23 in such position relatively to the fixed partition 13 that the distance between the seat 24 and the partition 13 is less than the distance of otherwise possible travel of the plunger disc 34 in the whirl chamber 20 from its location when the flange 22 abuts the shoulder 16 to a location of possible contact by the disc 34 with the domed interior of the cap 18. With the foregoing construction, the cup wall sections 30 of the spring seat 24 will engage the partition 13 as a stop to prevent contact of the plunger disc 34 with the cap 18 dome, and when such partition engagement occurs the interruptions in the cupped wall 29 provided by the grooves 28 in the spring seat will cooperate with the grooves 36 formed in the stem 23 to insure adequate flow of liquid through the partition opening 14 to the plunger passages 32 and hence to the slots 33.

The above-described embodiment has been illustrated merely for exemplary purposes as having an interiorly threaded body inlet 11. The hex portion shown in Fig.

1 may be dispensed with and exterior threads substituted, and it will be appreciated that the material of which the hex portion of Fig. 1 is formed may be eliminated entirely, with exterior threads being formed on the body 10 in the general area of the spring seat 24, thereby making it possible to shorten the nozzle if desired. Other modifications may also be made, such as a change in the structure of the cap 18, and it is not necessary that reliance for a stop means be placed on abutment of structure like the flange 22 with the shoulder 16 for an alternative construction may be used to achieve the same result. Such modifications are shown in Fig. 9, which corresponds to Fig. 1, which uses primes on reference numerals to indicate parts corresponding to those in Figs. 1–8, and which uses the Figs. 1–8 reference numerals where the Fig. 9 parts are identical.

With reference to Fig. 9, the nozzle body 10' is provided with a spring chamber 12' and with a coaxial bore 15' of lesser diameter to provide a shoulder 37 therebetween of greater diameter than the bore 15'. Located in the chamber 12' in abutment with the shoulder 37 and there upset into fixed position relatively to the body 10' is a washer 38 which is rearwardly dished and has a central opening 39 through which the plunger stem 23 extends. The washer opening 39 has a smaller diameter than the forward cupped end of the spring seat 24, and by reason of the dishing of the washer 38 it will be seen that should the pressure on the liquid be so great as to cause the compression of the spring 25 to be overcome to such an extent as to permit the forward cupped end of the spring seat 24 to engage the washer 38, its rearwardly dished construction coacts with the grooves 28 in the spring seat 24 and with the grooves 36 in the stem 23 to insure adequate flow of liquid through the washer opening 39 to the passages 32 and 33 of the plunger 21'.

With further reference to Fig. 9, the body 10' is provided forwardly with a cylindrical surface 17' having a diameter greater than that of the bore 15' and also greater than that of the disc 34 on the front end of the plunger 21'; and the cap 18' threaded into the forward end of the body 10', while having the same internal diameter as that of the cylindrical surface 17', is not forwardly domed but instead has a wholly cylindrical interior wall with a flat front 40 in which the axial discharge passage 19' is formed. This construction permits a greater length of movement of the plunger 21' into the cap 18' provided its dimensions axially are otherwise identical with those of the cap 18.

As a further Fig. 9 modification, the plunger 21' may be otherwise identical with the plunger 21, including extension of each slot 33 to the inner face of the disc 34, except that the flange 22 is eliminated, and the length of the bore 15' is less than the length of the plunger 21' so that when the plunger abuts the fixed washer 38 as a stop there is a space between the disc 34 and the shoulder 16' formed at the junction of the bore 15' with the cylindrical surface 17'. By reason of this construction there is always exposed within the whirl chamber 20' formed by the cylindrical surface 17' and the interior of the cap 18' as much of the slots 33 in the plunger 21' as is represented lengthwise by the amount by which the plunger 21' extends beyond the shoulder 16', as indicated in Fig. 9. This amount may be considered as corresponding to the length of the flange 22 portion of each slot 33 in the Figs. 1–8 embodiment, and it will be seen that the fixed washer 38 forms a stop means or abutment for the rear end of the plunger 21' to limit its movement away from the discharge orifice 19' under the influence of the spring 25 as does the shoulder 16 form a stop means or abutment for the flange 22 for the same purpose with respect to the plunger 21 and the discharge orifice 19.

Attention is also called to a further point about the structure shown in both Figs. 1 and 5 and in Fig. 9. In the first two named the diameter of the flange 22, which abuts the shoulder 16, is greater than the diameter of the plunger 21, and the diameter of the disc 34 is the same as that of the flange 22. By reason of this construction the portion of each slot 33 formed in the flange 22 is always exposed in the whirl chamber 20 and the inner face of the disc 34 forms a forward wall terminus for each exposed slot portion, being disposed at 90° to the length of the slot as shown in Figs. 1 and 5, with the result that at the forward end of each slot 33 the inner face of the disc 34 functions as a flow deflector means which offsets any tendency of liquid at initial or low pressures to flow out at an obtuse angle forwardly into the whirl chamber 20 as compared to being discharged thereinto in a manner directly tangential to the associated plunger passage 32. Tangential flow is important at all times to create whirling motion of liquid in the whirl chamber, and at initial or low pressures such flow makes for the greatest atomization commensurate with the pressures involved. With reference to Fig. 9, it will be seen that while the flange 22 is eliminated, the slot 33 and the disc 34 are retained and by reason of the abutment of the plunger 21' with the washer 38 a portion of each slot 33 formed in the plunger 21' is always exposed in the whirl chamber 20'. Since the disc 34 has a diameter greater than that of the plunger 21', it also forms a forward wall terminus for the exposed portion of each slot 33 in the plunger 21', acting as a flow deflector means to offset any tendency of liquid at initial or low pressures to flow out at an obtuse angle forwardly into the whirl chamber 20' as compared to being discharged thereinto in a manner directly tangential to the associated plunger passage 32. Both the Fig. 9 structure and that shown in Figs. 1–8 thus provide means to insure maximum atomization under initial or low pressure conditions.

Nothing herein set forth is to be interpreted as limiting the various features of the present invention in the scope of their application to use in connection with the particular structural details selected for purposes of explanation and illustration. While they are well suited to the mechanical embodiments of the invention illustrated and to the use to which they are put, the invention is not limited thereto nor to the disclosed details of construction nor to the conjoint use of all disclosed features. They may be variously modified within the skill of the artisan without departing from the true scope of the actual invention, the characteristic features of which are set forth in the following claims which intentionally use generic terms and expressions that are inclusive in meaning of various modifications.

What is claimed as new is:

1. A nozzle structure having, in combination: a body portion provided with a liquid inlet and with a bore in communication therewith; a whirl chamber provided with a discharge orifice; a member reciprocable in the bore and whirl chamber and provided with a rear end, said member also being provided with internal longitudinal passages extending from said rear end so as to be in communication with the bore, said member also being provided with passages which extend from said longitudinal passages outwardly tangentially therefrom to the surface of said member so that portions of said tangentially extending passages are exposed in the whirl chamber to form a communication between it and the bore by way of said longitudinal passages, and said member being reciprocable from a retracted position with respect to the whirl chamber to and from an extended position into the whirl chamber thereby to vary the extent of exposure of said passage portions in the whirl chamber and so vary the volume of liquid discharged into the whirl chamber from said tangentially extending passages; and means for normally maintaining the member in said retracted position.

2. Structure such as set forth in claim 1 characterized by the presence of stop means for limiting the movement of the member into the whirl chamber.

3. Structure such as set forth in claim 1 characterized by the presence of means movable with the member engageable with means in fixed position relatively to the body portion for limiting the movement of the member into the whirl chamber.

4. A nozzle structure having, in combination: a body portion provided with a liquid inlet and with a bore in communication therewith; a whirl chamber provided with a discharge orifice coaxial with the bore; a member reciprocable in the bore and whirl chamber and provided with a rear end, said member also being provided with internal longitudinal passages extending from said rear end so as to be in communication with the bore, said member also being provided with passages which extend from said longitudinal passages outwardly tangentially therefrom to the surface of said member so that portions of said tangentially extending passages are exposed in the whirl chamber to form a communication between it and the bore by way of said longitudinal passages, and said member being reciprocable toward and away from the discharge orifice to vary the extent of exposure of said passage portions in the whirl chamber and so vary the volume of liquid discharged into the whirl chamber from said tangentially extending passages for discharge from said orifice; and means for normally maintaining the member in a retracted position away from said orifice.

5. Structure such as set forth in claim 4 characterized by the presence of stop means for limiting the movement of the member toward said orifice.

6. Structure such as set forth in claim 4 characterized by the presence of means movable with the member engageable with means in fixed position relatively to the body portion for limiting the movement of the member toward said orifice.

7. A nozzle structure having, in combination: a body portion provided with a liquid inlet and with a bore in communication therewith; a whirl chamber provided with a discharge orifice coaxial with the bore; a member reciprocable in the bore and whirl chamber and having a length greater than that of the bore, said member also having a rear end; stop means engageable with the member for limiting its movement in the bore in a direction away from the discharge orifice so that a portion of the member is always located in the whirl chamber; said member being provided with internal longitudinal passages extending from its rear end so as to be in communication with the bore, said member also being provided with passages which extend from said longitudinal passages outwardly tangentially therefrom to the surface of said member so that portions of said tangentially extending passages are exposed in the whirl chamber to form a communication between it and the bore by way of said longitudinal passages, said tangentially extending passages being formed partially in the portion of the member which is always located in the whirl chamber and partially in the portion of the member which is located in the bore when the member is engaged with said stop means; and yielding means for normally maintaining the member in engagement with said stop means.

8. Structure such as set forth in claim 7 characterized by the presence of means for limiting the movement of the member toward the discharge orifice.

9. Structure such as set forth in claim 7 characterized by the presence of means movable with the member engageable with means in fixed position relatively to the body portion for limiting the movement of the member toward said orifice.

10. A nozzle structure having, in combination: a body portion provided with a liquid inlet and with a bore in communication therewith; a whirl chamber provided with a discharge orifice; a member reciprocable in the bore and whirl chamber and provided with a rear end, said member also being provided with internal longitudinal passages extending from said rear end so as to be in communication with the bore, said member also being provided with passages which extend from said longitudinal passages outwardly tangentially therefrom to the surface of said member so that portions of said tangentially extending passages are exposed in the whirl chamber to form a communication between it and the bore by way of said longitudinal passages; and flow deflector means carried by the member and forming a forward wall terminus for each exposed passage portion.

11. A nozzle structure having, in combination: a body portion provided with a liquid inlet and with a bore in communication therewith; a whirl chamber provided with a discharge orifice coaxial with the bore; a member reciprocable in the bore and whirl chamber and having a length greater than that of the bore, said member also having a rear end; stop means engageable with the member for limiting its movement in the bore in a direction away from the discharge orifice so that a portion of the member is always located in the whirl chamber; said member being provided with internal longitudinal passages extending from its rear end so as to be in communication with the bore, said member also being provided with passages which extend from said longitudinal passages outwardly tangentially therefrom to the surface of said member so that portions of said tangentially extending passages are exposed in the whirl chamber to form a communication between it and the bore by way of said longitudinal passages, said tangentially extending passages being formed partially in the portion of the member which is always located in the whirl chamber when the member is engaged with said stop means so that a portion of each passage is always exposed in the whirl chamber; and flow deflector means carried by the member and forming a forward wall terminus for each exposed passage portion.

References Cited in the file of this patent

UNITED STATES PATENTS

| 1,073,936 | Schorr | Sept. 23, 1913 |
| 2,243,995 | Alden | June 3, 1941 |

FOREIGN PATENTS

| 837,789 | France | Nov. 18, 1938 |